United States Patent Office

3,838,193
Patented Sept. 24, 1974

3,838,193
METHOD OF TREATING NITROGEN OXIDE GENERATING SUBSTANCES BY COMBUSTION
Yoshiaki Kajitani, Ibaragi, and Hayami Ito and Susumu Mitsuda, Kobe, Japan, assignors to Kawasaki Jukogyo Kabushiki Kaisha, Kobe-shi, Hyogo, Japan
Filed Mar. 13, 1972, Ser. No. 234,155
Claims priority, application Japan, Mar. 13, 1971, 46/13,851
Int. Cl. C01b *21/00, 21/24*
U.S. Cl. 423—351   8 Claims

ABSTRACT OF THE DISCLOSURE

A method of treating nitrogen oxide generating substances by combustion in a reducing flame atmosphere which has the steps of introducing the substance which generates nitrogen oxide by combustion, such as ammonia, hydrogen cyanide or other nitrogen containing gases or a mixture of these gases, into a high temperature reducing flame produced by the combustion of fuel gas containing hydrogen, carbon monoxide, a gaseous hydrocarbon and mixtures thereof, with a primary air supplied in an amount below the amount of air theoretically required for combustion of the fuel gas whereby the generated nitrogen oxides are reduced to nitrogen in the high temperature reducing flame, and if required supplying a third air to the relatively high temperature portion out of the flame thereby burning any unburned components.

BACKGROUND OF THE INVENTION

Field of the Invention

This invention relates to a method of treating a nitrogen oxide-generating substance by combustion thereof; and more particularly to a method of treating a nitrogen oxide generating substance upon combustion of ammonia, hydrogen cyanide, other nitrogen containing gases or a mixture of gases containing these in a reducing flame atmosphere.

Description of the Prior Art

Various treatments for rendering ammonia and hydrogen cyanide harmless have been recently discussed in connection with pollution control. Particularly, when ammonia is treated with wet activated sludge, the ammonia must be diluted to a low solution concentration which makes it necessary to treat a great quantity of this dilute solution. On the other hand, when ammonia gas is simply treated by combustion, the disadvantage obtained is that it produces quantities of NO and $NO_2$ gases which cause atmospheric pollution.

A chemical equilibrium concentration relationship exists between nitrogen oxide, oxygen and nitrogen and their equilibrium concentration is low at low temperatures. For example at a temperature of 1,027° C., as the equilibrium concentration of nitrogen oxide in air is very low, there is no pollution even if it is exhausted without treatment. However, when the normal combustion method is used, a long time is required to reduce the concentration by holding it at this relatively low temperature. In the reaction of $2NO \rightarrow N_2 + O_2$, the time required for the NO to decompose to become ½ of the equilibrium concentration is 123 hours at a temperature of 625° C. and 44 minutes at 1,027° C. It is extremely difficult to hold normal combustion devices at these temperatures for a long time.

SUMMARY OF THE INVENTION

This invention contemplates the elimination of the aforementioned problems by providing a method of treating substances which normally generate nitrogen oxide upon combustion, such as ammonia, hydrogen cyanide, other gases containing nitrogen or a mixture of gases containing these materials. The method comprises combusting these substances by using a combustible gas containing hydrogen, carbon monoxide or gaseous hydrocarbons such as city gas so as not to generate NO and $NO_2$ or so as to only slightly generate them. More particularly ammonia, ammonia with steam, ammonia with other nitrogen containing gases or another nitrogen containing gas are burned with secondary air and they are introduced into high temperature reducing flame produced by the combustion of a fuel gas with an amount of air below the theoretical amount of air required for complete combustion so as to reduce the amount of nitrogen oxide gas which would be generated by the combustion of ammonia or other nitrogen containing gases. In this case, the amount of secondary air is preferably 90 to 95% of the amount of air theoretically required for the total combustion of gases after the amount of primary air supplied is subtracted. A further feature of the invention is that if it has unburned components, third air is supplied to the relatively high temperature portion out of the flame to burn these components.

The other features and advantages of this invention will become apparent from the following description taken in conjunction with the accompanying drawings.

DESCRIPTION OF THE PREFERRED EMBODIMENTS

Figure 1:
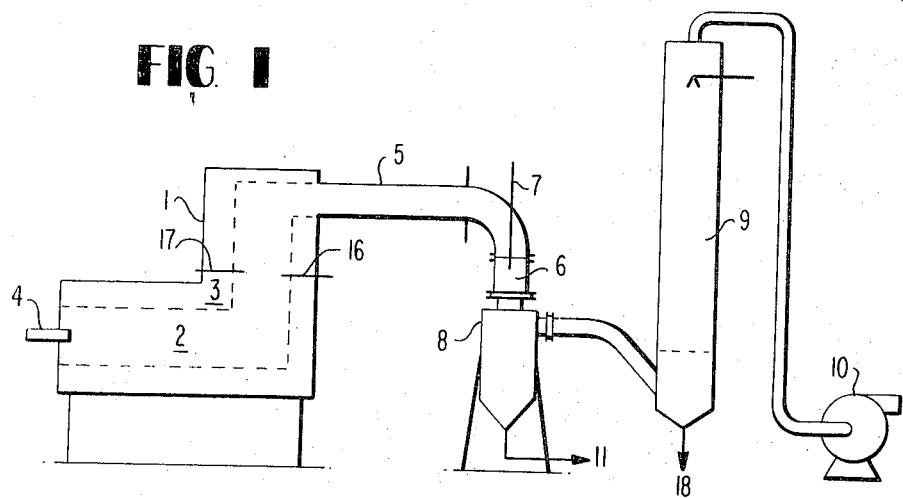
FIG. 1 is a flow diagram of the apparatus used in this invention.

Reference is now made to the drawings, particularly to FIG. 1, which shows the apparatus used in this invention. The combustion furnace body 1 has a furnace chamber 2 with furnace wall 3 made of heat insulating refractory material and a burner 4 for the combustion of ammonia which is further illustrated in FIG. 2. Flue 5 is connected to venturi scrubber 6 for cooling the flue gas having a water supply nozzle 7. The gas and water are separated in chamber 8 with the gas passing to an absorbing tower 9 filled with Raschig rings, and exhausted by blower 10. Liquids leave via outlets 11 and 18 and port 16 introduces the third air. City gas is supplied via port 12, the primary air is supplied via inlet 13, the secondary air is supplied via port 14, the nitrogen oxide generating substance enters via port 15, and 17 serves as an additional port.

In the operation of this constructed apparatus, city gas is introduced from the gas supply port 12 while primary air is supplied from the primary air inlet 13 in the amount of 80 to 95%, preferably 85 to 90% of the theoretical air amount required for city gas so as to burn it to make a high temperature reducing flame. The substance which normally generates nitrogen oxide upon combustion such as ammonia or a gas containing ammonia is supplied from port 15 so as to be introduced into the high temperature flame. Secondary air is introduced from the port 14. Additional air insufficient for complete combustion is supplied from the port 16 as the third air in the relatively high temperature (900 to 950° C.) portion out of the flame so that in the interior of the high temperature flame unburned fuel gases remain. The nitrogen oxides NO and $NO_2$ generated upon combustion of ammonia are reduced to nitrogen and an oxide of the reducing gas by the following reactions:

$$2NO + 2H_2 \rightarrow N_2 + 2H_2O$$
$$2NO + 4H_2 \rightarrow N_2 + 4H_2O$$

These product gases are harmless when the reducing gas is hydrogen.

This invention may be applied to the substances generating nitrogen oxide by combustion such as not only the aforesaid ammonia or gas containing ammonia, but also, substances such as hydrogen cyanide or other nitrogen containing gases which generate nitrogen oxide upon combustion. Examples of these materials also include liquid and solid ammonium sulfide, ammonium chloride, synthetic high polymeric substances such as nylon, acrylonitrile or carbon dust.

Example 1 (Treatment of Pure Ammonia)

The apparatus was arranged as shown in FIG. 1.

City gas was used as the combustion gas. The composition of city gas is shown in Table 1.

TABLE 1

| Types of Gas: | Vol. percent |
|---|---|
| $CO_2$ | 4 |
| $C_3H_8$ | 3 |
| $O_2$ | 3 |
| CO | 8 |
| $H_2$ | 44 |
| $CH_4$ | 25 |
| $N_2$ | 13 |

Figure 2A:
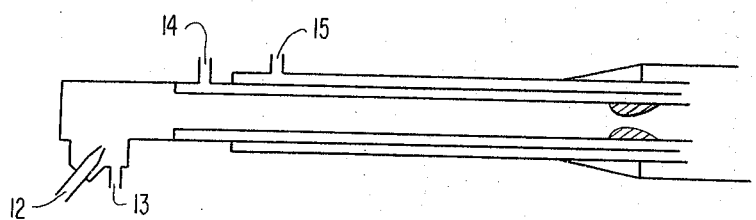
FIG. 2A is a schematic view of one example of a burner used in this invention in which ammonia and secondary air surround the flame of city gas.
Figure 2B:
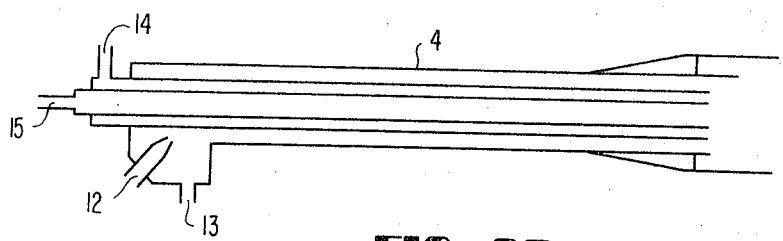
FIG. 2B is a view similar to FIG. 2A but showing a burner in which a city gas flame surrounds ammonia and secondary air.

The burner utilized was constituted so as to surround the reducing high temperature flame with ammonia and secondary air as shown in FIG. 2A. The dimensions of the furnace are 250 mm. x 250 mm. x 850 mm.+200 mm. x 200 mm. x 1000 mm. The treating conditions and results are shown in Table 2.

The treating conditions and results are shown in Table 3.

TABLE 3

| Liters per second | | | | Steam, N l./sec. | $NH_3$/$NH_3$ plus steam wt., percent | Primary air/theoretical city gas air | Total air/total theoretical air | Temp. in furnace, °C. | Temp. in duct, °C. | Composition of gas, p.p.m. | | |
|---|---|---|---|---|---|---|---|---|---|---|---|---|
| City gas | Ammonia | Primary air | Secondary air | | | | | | | $NH_3$ | NO | NO |
| 1 | 0.78 | 3.5 | 3.43 | 0.79 | 50 | 0.8 | 0.95 | 830 | 370 | 0 | 0–0.6 | |
| 0.909 | 0.785 | 3.66 | 3.23 | 1.9 | 28 | 0.916 | 0.994 | 863 | 382 | 15 | 0 | 4 |
| 0.898 | 0.835 | 3.65 | 3.21 | 2.04 | 27.8 | 0.925 | 0.969 | 804 | 352 | 0 | 0 | 50 |

What we claim is:

1. A method of treating a nitrogen oxide generating substance by combustion in a reducing flame atmosphere comprising the steps of
   (1) producing a high temperature reducing flame by the combustion of a fuel gas with a first source of air, said fuel gas producing on combustion substantially no nitrogen oxides and said air being in an amount from 80 to 95% the theoretical amount required for the complete combustion of the fuel gas,
   (2) combusting a nitrogen oxide generating substance in the presence of a second source of air, said amount of air from said second source being the theoretical amount of air or slightly below the theoretical amount of air required for complete combustion of said nitrogen oxide generating substance to nitrogen oxide,
   (3) introducing said combusted nitrogen oxide generating substance produced in step (2) into said high temperature reducing flame produced in step (1); whereby said nitrogen oxides are substantially reduced to nitrogen by the unburned fuel gas contained in the high temperature flame.

2. The method of claim 1 wherein said fuel gas comprises hydrogen, carbon monoxide, gaseous hydrocarbons and mixtures thereof.

3. The method of claim 1 wherein additional air is supplied to the relatively high temperature portion out of the flame to burn any unburned components from the flame.

4. The method of claim 1 wherein said nitrogen oxide generating substance is selected from the group consisting of ammonia, gases containing ammonia, hydrogen cyanide, gases containing hydrogen cyanide and mixtures thereof.

5. The method of claim 1 wherein the air supplied from said second source of air constitutes from 90 to 95% of the additional amount of air required for the total combustion of all gases in addition to the amount of air supplied from said first source.

6. The method of claim 5 wherein said fuel gas is city gas.

7. The method of claim 5 wherein the air supplied from said first source of air constitutes from 85 to 90% of the theoretical amount of air required to completely combust said fuel gas.

8. The method of claim 5 wherein additional air is supplied from a third source of air to a high temperature zone having a temperature of from 900 to 950° C. out of the reducing flame, the additional air from said third source of air being supplied in an amount insufficient to completely combust any unburned fuel gases remaining in the high temperature flame.

TABLE 2

| Liters per second | | | | Primary air/amount of theoretical air for the city gas | Total air/total theoretical air | Temp. in furnace, °C. | Temp. in duct, °C. | Composition of gas, p.p.m. | | |
|---|---|---|---|---|---|---|---|---|---|---|
| City gas | Ammonia | Primary air | Secondary air | | | | | $NH_3$ | $NO_2$ | NO |
| 0.999 | 0.75 | 3.65 | 2.87 | 0.83 | 0.905 | 865 | 330 | 0 | 5 | 0.6 |
| 0.949 | 0.845 | 3.45 | 3.27 | 0.783 | 0.915 | 930 | 405 | 0 | 0.8 | 7.5 |
| 0.947 | 0.952 | 3.73 | 3.61 | 0.895 | 0.948 | 905 | 350 | 0 | 3–5 | 1–3 |
| 0.874 | 0.930 | 3.26 | 3.52 | 0.848 | 0.924 | 880 | 360 | 0 | 3 | 10 |

NOTE.—The third air was all 3.5 l./sec.

Example 2 (Treatment of Ammonia Containing Steam)

The apparatus and the burner were the same as those used in the Example 1.

(References on following page)

References Cited

UNITED STATES PATENTS

| | | | |
|---|---|---|---|
| 3,000,707 | 9/1961 | Barstow | 23—220 X |
| 1,487,647 | 3/1924 | Fauser | 23—220 |
| 3,118,727 | 1/1964 | Cohn | 23—220 |
| 3,125,408 | 3/1964 | Childers et al. | 23—220 |
| 2,673,141 | 3/1954 | Barman | 423—235 |

FOREIGN PATENTS

| | | | |
|---|---|---|---|
| 871,755 | 6/1961 | Great Britain | 23—220 |

OSCAR R. VERTIZ, Primary Examiner

H. S. MILLER, Assistant Examiner

U.S. Cl. X.R.

423—235, 405